United States Patent
Hager et al.

(10) Patent No.: US 7,180,000 B2
(45) Date of Patent: Feb. 20, 2007

(54) LOW COST, HIGH PERFORMANCE, FLEXIBLE, WATER-SWELLABLE REINFORCEMENT FOR COMMUNICATIONS CABLE

(75) Inventors: Thomas P. Hager, Westerville, OH (US); Richard N. Lehman, Newark, OH (US); James R. Priest, Nashport, OH (US)

(73) Assignee: Neptco JV LLC, Pawtucket, RI (US)

( * ) Notice: Subject to any disclaimer, the term of this patent is extended or adjusted under 35 U.S.C. 154(b) by 0 days.

(21) Appl. No.: 10/611,513

(22) Filed: Jul. 1, 2003

(65) Prior Publication Data

US 2004/0065457 A1     Apr. 8, 2004

Related U.S. Application Data

(63) Continuation-in-part of application No. 10/246,007, filed on Sep. 18, 2002.

(51) Int. Cl.
*H01B 7/29* (2006.01)

(52) U.S. Cl. ............... 174/116; 174/113 R; 174/110 R; 174/107; 174/119 C; 428/297.4; 428/298.7; 428/298.1; 428/299.1

(58) Field of Classification Search ............... 174/116, 174/113 R, 110 R, 107, 119 C; 428/297.4, 428/298.7, 298.1, 299.1
See application file for complete search history.

(56) References Cited

U.S. PATENT DOCUMENTS

| | | | |
|---|---|---|---|
| 4,636,437 A * | 1/1987 | Algrim et al. ............... | 428/391 |
| 5,286,562 A * | 2/1994 | Girgis ......................... | 428/391 |
| 5,512,625 A | 4/1996 | Butterbach et al. ......... | 524/490 |
| 5,925,461 A * | 7/1999 | Fairgrieve .................... | 428/372 |
| 6,004,676 A * | 12/1999 | Girgis ......................... | 428/391 |
| 6,677,394 B1 * | 1/2004 | Butterbach et al. ......... | 524/388 |

FOREIGN PATENT DOCUMENTS

| | | |
|---|---|---|
| EP | 0 291 023 | 11/1988 |
| EP | 0 685 855 | 12/1995 |
| EP | 1 076 253 | 2/2001 |
| GB | 1 485 253 | 9/1977 |
| JP | 01022982 A * | 1/1989 |

OTHER PUBLICATIONS

Abstract in English of JP 01022982A-Derwent Acc. No. 1989-071749.*

H.-H. Shih and G.R. Hamed—"Peel Adhesion and Viscoelasticity of Poly (ethylene-co-vinyl acetate)- Based Hot Melt Adhesives. I. The Effect of Tackifier Compatibility"—Journal of Applied Polymer Science, John Wyley and Sons Inc., New York, vol. 63, No. 3, Jan. 18, 1997, pp. 323-331.

* cited by examiner

*Primary Examiner*—Jinhee Lee
(74) *Attorney, Agent, or Firm*—Mintz, Levin, Cohn, Ferris, Glovsky and Popeo, P.C.

(57) ABSTRACT

A low cost, high performance, water-swellable, flexible reinforcement member that can be used for both optical and copper communications cable. The water-swellable reinforcement members made according to the preferred process are more rigid than known reinforcement members, but are less rigid than glass pultruded rods. Communications cables utilizing these members are lightweight, water-swellable and exhibit an improved combination of strength and flexibility compared to traditional communications cables. Further, these communication cables may then be installed into underground ducts using more economical and faster installation techniques.

19 Claims, 6 Drawing Sheets

LOW COST, HIGH PERFORMANCE, FLEXIBLE, WATER-SWELLABLE REINFORCEMENT FOR COMMUNICATIONS CABLE

CROSS REFERENCE TO RELATED APPLICATIONS

This application is a continuation-in-part of U.S. patent application Ser. No. 10/246,007, filed Sep. 18, 2002, which is herein incorporated by reference in its entirety.

TECHNICAL FIELD AND INDUSTRIAL APPLICABILITY OF THE INVENTION

The present invention relates generally to reinforced communication cables and more specifically to a low cost, high performance, flexible, water-swellable reinforcement for communications cables.

BACKGROUND OF THE INVENTION

Optical communications cables consist essentially of a plurality of randomly placed optical communication fibers, typically in ribbon form, contained within a polymer jacket. Of course, other types of communications cables can have single optical fibers, bundled optical fibers, or tight buffered optical fibers. The fibers are typically tight or loose buffered within a polymer tube contained within a portion of the jacket. One or more flexible reinforcement members and stiff strength members may also be contained within a portion of the polymer jacket outside of the central tube or buffer tubes to provide support and prevent kinking of the communication fibers. These reinforcement members are applied by being wrapped helically around the inner core prior to outer jacketing (as in optical loose tube cable types) or are directly extruded into the jacket matrix (as in twisted copper telephone cable).

The flexible reinforcements for cables are made in a wide variety of methods. Typically, these reinforcements are manufactured by first applying a binder and sizing containing a film former and oils or coupling agents to a glass strand and then applying a relatively heavy layer of a water-based, high molecular weight polymer latex or wax. The coated strands may then be introduced to the communications cables by known methods.

One problem with presently available reinforcements is that they are relatively expensive to manufacture. For example, a relatively heavy layer of high molecular weight polymer latex or wax must be applied to the fibers in order to impart the mechanical properties necessary for optical and copper telecommunications cables. Also, these high molecular weight polymers have extremely high melt viscosities. Further, air can be trapped within the interstices of the fibers themselves after the introduction of the high molecular weight polymers, which can lead to premature degradation of the fibers and strand deficiencies. Also, because water-based high molecular weight coatings are typically used, a high-energy water-removal step is required before the fiber reinforcements can be introduced into the cabling. These water-based coatings, typically in emulsion form, are expensive as well.

These coatings may impart many important properties to the flexible reinforcements both during manufacture and after introduction to the cable. For example, these coatings prevent abrasion of the glass fibers during the combination with the reinforcement and during deployment. Also, these coatings prevent adhesion of the reinforcing fibers to the polymer jacket. These coatings may also impart adhesion if desired to the polymer jacket, for example, as is the case with polyvinyl chloride (PVC) jacketed communications cables. Additionally, these coatings can be super absorbent and can thus prevent water seepage from damaging the optical fibers.

Deterioration caused by the invasion of moisture beneath the exposed surfaces of articles used in outdoor environments is a well-known problem. This deterioration includes oxidative deterioration caused by reaction of water with the surfaces of reinforcing fibers used in these articles, as well as water-induced corrosion. In marine environments, for example, the problems associated with water logging are particularly compounded by the salinity of the environment. The presence of salt in such aqueous environments hastens the oxidative decomposition. In non-saline environments, for example in environments having high atmospheric humidity, water-resistant coatings are necessary to protect the structures and equipment surfaces from moisture-induced decomposition.

Articles affected by the deterioration described above include items having a surface exposed to high moisture or humidity. Examples of such articles include reinforced rods and cables, such as fiber optic or telecommunications cables. These telecommunications cables are often used in situations where they are buried underground or submerged in water over long periods. As such, protection from water damage is critical to the structural integrity of these cables and to the success of the functions they are intended to perform. A telecommunications cable, for example, may include a core comprising a glass rod that acts as a stiffening or reinforcing member. This rod contributes to the rigidity of the cable. When water penetrates to contact the core element of the cable, corrosion or chemical deterioration of the cable infrastructure may result.

U.S. Pat. No. 5,925,461 teaches a hot melt coating adhesive having a 20–50 parts by weight dispersion of a water-swellable particulate material to 100 parts by weight of hot melt. The above patent further teaches the process of using a heated bath with the above formulation, submerged saturator bars, stripper die, shaping rollers and winder.

The process described in the above patent has difficulties. The recommended hot melt material is an ethylene vinyl acetate (EVA) polymer. The superabsorbent particulate is most likely a sodium or potassium polyacrylate salt, also referred to as a superabsorbent polymer (SAP). Examples of such polymers include, but are not limited to, ethylene vinyl acetate (EVA) polymers, block copolymers of polybutylene terepthalate and long chain polyether glycols, thermoplastic elastomers, olefins or urethanes, polypropylene, polyethylene, polyurethane or low molecular weight mineral wax. Polyacrylamides may also be utilized.

It is well known that polymers such as EVA are high molecular weight and subsequently display very high melt viscosities, even at very elevated temperatures.

Typical sizes, binders and water-based impregnants have viscosities in the 20–200 cp range. These lower viscosity fluids easily penetrate the glass fiber bundle, coating individual glass filaments, and results in both well protected fiber-fiber abrasion, as well as subsequent high measured tensile strength, due to the good stress translation afforded by the complete wet-through of the matrix coating.

Conversely, attempting to impregnate a bundle of glass filaments with a highly viscous fluid or melt, such as that taught in U.S. Pat. No. 5,925,461, would quickly result in extremely high shear forces between the glass filaments and the submerged bars in the bath. These forces could quickly exceed the individual tensile strength of the fibers, breaking out individual filaments and eventually breaking out the strand. This can be minimized if the process moves very slowly, probably much less than 10–30 meters/min. Even then, the very viscous mixture would have great difficulty efficiently penetrating the interstices between glass filaments unless other process equipment is installed, such as heated applicator drums or rollers. Additionally, adding extra equipment in general complicates a process line and makes it more prone to disruptions.

The present invention solves the above problems in fabricating water swellable, semi-flexible cable reinforcements of small diameter by using blends of hot melt coatings in various coating sequences. In another embodiment, a previously coated superabsorbent strand is coated with a hot melt coating.

SUMMARY OF THE INVENTION

A low cost, high performance, water-swellable, flexible glass reinforcement member is provided that can be used for both optical and copper communications cables. The reinforcement members made according to the preferred process are more rigid than glass reinforcement members made according to the prior art as described above, but are less rigid than glass pultruded rods. Communications cables utilizing these members are lightweight and exhibit an improved combination of strength and flexibility compared to traditional communications cables. Further, these communication cables may then be installed into underground ducts using more economical and faster installation techniques such as blowing-in installation.

In a first embodiment of the present invention, blends of hot melt coatings are applied to a fiber material in various coating sequences using a high speed coating process. The reinforcement member is made by first melting and then applying a low molecular weight, low melt viscosity thermoplastic material, such as modified or unmodified polyethylene or wax, to fiber material. The fiber material can be a glass strand or bundle, or combination of strand and bundle that penetrates the interstices within and between the fibers.

The wax material is air cooled prior to the introduction of a second layer of nonwater-based high molecular weight ("MW") polymer, such as ethylene acrylic acid topcoats, a high molecular weight polypropylene and polyethylene copolymer topcoats, ethylene vinyl acetate copolymer topcoats, and styrene-butadiene-styrene topcoats. The topcoats are applied to the strand in an extruder or similar device. The high molecular weight polymer surrounds the strands, but does not penetrate. The topcoat polymer is tough, but flexible, and gives the strand mechanical properties for use in cable systems. The overall amount of topcoat polymer applied to the strand is less than is present in cables of the prior art. The advantage of using this method is to completely water block a glass bundle comprised of many filaments or collections of glass bundles using a very high speed process that significantly reduces the cost of manufacturer of the water blocked reinforcement as is known in the art.

In another embodiment of the present invention, a previously coated strand, coated with a superabsorbent coating, is coated with a high molecular weight, hot melt polymer as described above.

The water-swellable, flexible reinforcement made according to these processes exhibits lower amounts of trapped air that is typically trapped within the strands and/or bundles, thereby-decreasing the likelihood and amount of potential degradation within the fiber. The method also prevents strand deficiencies such as fiber-fiber abrasion and water penetration, and can thereby increase the strength of the strands, and hence the reinforcement, without the application of a heavy layer of high molecular weight polymer. Further, by not using a water-based coating, additional savings is realized by both in terms of the water removal and raw material costs.

Other objects and advantages of the present invention will become apparent upon considering the following detailed description and appended claims, and upon reference to the accompanying drawings.

DETAILED DESCRIPTION AND PREFERRED EMBODIMENTS OF THE INVENTION

Figure 1:
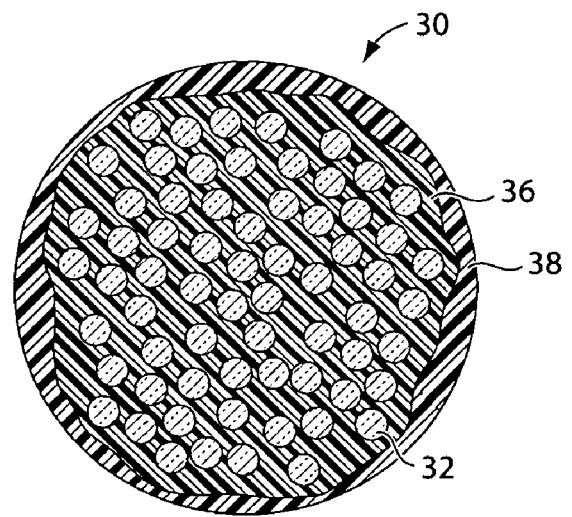
FIG. 1 is a cross-sectional view of a flexible reinforcement member according to the present invention.
Figure 2:
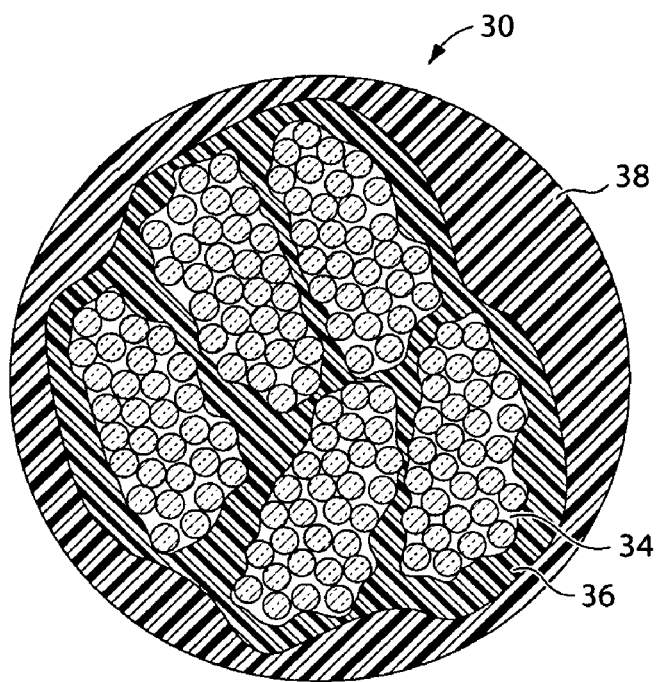
FIG. 2 is a cross-sectional view of a flexible reinforcement member according the present invention.
Figure 3:
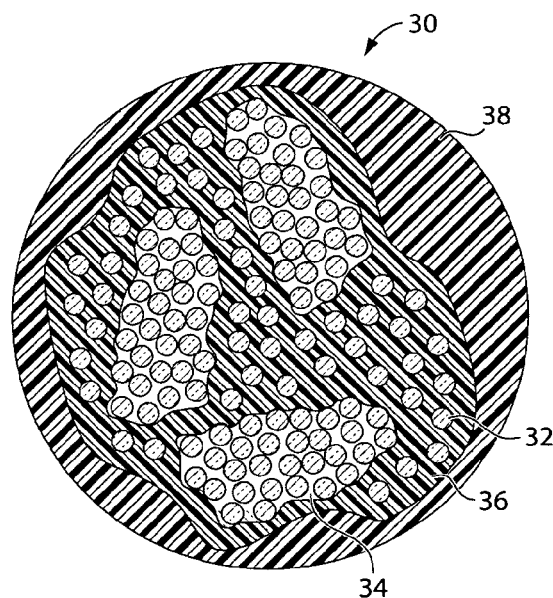
FIG. 3 is a cross-sectional view of a flexible reinforcement member according the present invention.

The present invention relates to a new water-swellable, flexible reinforcement member that may be used in telecommunication cables such as optical cables or copper cables. FIGS. 1–3 below illustrate three preferred embodiments of the water-swellable, flexible reinforcement member.

FIG. 1 illustrates a cross-sectional view of the water-swellable, flexible reinforcement member 30 according to a preferred embodiment of the present invention. The member 30 is comprised of a strand having a plurality of single filaments 32 of glass fibers saturated with a primary saturant 36. The diameter of the filaments is preferably between about 1 and about 89 microns, more preferably between about 15 and about 36 microns and most preferably between about 34 and about 36 microns.

Referring now to FIG. 2, another preferred embodiment shows the member 30 having a plurality of strand bundles 34 replacing the individual filaments 32. Also, FIG. 3 depicts the member 30 as having a combination of both filaments 32 and bundles 34. Again, in both FIGS. 2 and 3, the fibers that comprise the filaments 32 and/or bundles are saturated with the primary saturant 36. The filaments 32 are preferably filamentized strands and are approximately 1 to about 86 microns in diameter, more preferably between about 15 and about 36 microns in diameter and most preferably between about 34 and about 36 microns in diameter. The bundles 34 have approximately 100–4000 filaments per bundle 34 and have a linear density of approximately 200–9600 grams/kilometer.

The filaments 32 and bundles 34 are preferably glass fibers such as E-type glass fibers or ECR-type glass fibers such as Advantex® type glass fibers, both available from Owens Corning. Additionally, other fibers may be used including, but not limited to, high silica glass such as S-2 Glass®, Zentron®, Vetron® or other high strength glass from Advanced Glass Yarns (Aiken, S.C.) or other glass manufacturers; high tenacity, linear, or other high modulus reinforcements. The term "high modulus" is defined as the modulus of elasticity, also known as Young's Modulus, which is a coefficient of elasticity representing the ratio of stress to strain as a material is deformed under dynamic load. It is the measure of softness or stiffness of a material. In the case of "high modulus" reinforcements, the values for the stress to strain ratio will typically exceed 30 GPa. For the above examples, the typical elastic modulus of each are as follows: E-Glass=72 GPa; S-2 Glass® fiber=90 GPa.

The glass fibers are preferably sized with a sizing composition or finishing agent prior to introduction within the member 30. Such sizings include epoxy/silane, vinylester, polyester, or starch/oil type sizings. Preferably, Owens Corning sizing 158B, 111A or 366 is used.

The saturant 36 fills in the interstices between the strands 32 and/or bundles 34 and comprises about 0.1–35 percent, and more preferably about 15 percent, of the total weight of the member 130. The saturant 36 also fills the voids within the filaments 32 and/or bundles 34 caused by abrasions and or defects in the manufacturing process. In this way, the saturant 36 functions to lower the amount of air that is typically trapped between the filaments 32 and bundles. The saturant also lowers the amount of air that may be trapped within the bundles 34. The saturant 36 also prevents filament deficiencies such as fiber-fiber abrasion, water penetration, and can increase the strength of the filaments 32. In these ways, the saturant 36 increases the strength of the member 30.

The saturant 36 comprises a low molecular weight mineral wax having melting points under approximately 300 degrees Celsius, preferably less than 150 degrees Celsius and most preferably between about 100 and about 120 degrees Celsius and melt viscosities of less than approximately 1000 centipoise (cps), preferably less than 500 centipoise, that allow easy-saturation into the fiber strands 32 or bundle 34. One preferable mineral wax is a microcrystalline wax such as Witco Chemical's Multiwax, which has a melting point of approximately 70–80 degrees Celsius (160–170 degrees Fahrenheit) and a melt viscosity of approximately 50–100 cps. Other examples of mineral waxes that may also be used include polyalphaolefin waxes, such as Baker Petrolite Vybar 260, and polyethylene waxes, such as Baker Petrolite Polywax 100. Additionally, modified polyethylenes and polypropylenes may also be used, such as Eastman Chemicals Epolene E-15 and E-43 oxidized polyethylene or Epolene G-3015 maleated polypropylene.

The primary saturant 36 is typically between 90/10 to 10/90 by weight blend, and more preferably a 50/50 by weight blend, of a microcrystalline wax and styrene butadiene rubber ("SBR") compound. As above, one preferred microcrystalline wax that may be used is Witco Chemical's Multiwax. One preferred SBR compound used in the saturant 36 is DHM 712, available from DHM Adhesives, Inc. The DHM 712 has a softening point of approximately 95 degrees Celsius (203 degrees Fahrenheit) and a viscosity of 2250 cps at 177 degrees Celsius (350 degrees Fahrenheit). Blends of other high and low viscosity thermoplastic polymers or highly plasticized polymers can be similarly used, as long as the primary saturant material has less than 500 cps melt viscosity.

As shown in FIGS. 1–3, high molecular weight, water-swellable topcoat 38 may be applied to the coated filaments 32 and bundle 34. The high molecular weight, water-swellable polymer topcoat 38 surrounds the saturant 36, but preferably does not penetrate within the saturant 36 to the filaments 32 and bundle 34. The water-swellable topcoat 38 comprises approximately 0.1–35 percent, preferably between about 5 and about 20 percent and more preferably between about 10 and about 15 percent, of the total weight of the member 30. The topcoat 38 is tough, but flexible, and improves the mechanical properties of the member 30.

The water swellable topcoat 38 on the member 30 provides water protection capabilities to the optical fiber cable. A preferred water-swellable topcoat is an ethylene vinyl acetate (EVA) polymer such as Henkel Macromelt Q 4411-22 (Henkel Adhesives, Elgin, Ill.). Additionally, Henkel produces other similar grades with various amounts of superabsorbent particulate added to the polymer.

Blending the Q 4411-22 with another hot melt, non-water swellable grade, ethylene vinyl acetate hot melt such as Henkel 80-8254 significantly improves the coating uniformity of the hot melt. A 2:1.1 mixture of Q 4411-22 and 80-8254 lowers the total amount of superabsorbent particulate to less than 20% in the topcoat layer. This improves processing by lowering viscosity and the total amount of particulate as solid particulate suspended in the hot melt tends to interfere with efficient coating. Further, the coating is less abrasive and coats more smoothly. By blending the water-swellable material with the non water-swellable material decreases the tendency of the superabsorbent particles to drop to the applicator bottom and char against the hot lower surface.

Based on the total hot melt coating of about 25 wt. % organic on the glass, the percent of superabsorbent particles in the total coating using about a ratio of 50:50 microcrystalline wax saturant to a blend of Q 4411-22 and 80-8254 (at 2:1 ratio) is about 10 wt. % total superabsorbent powder on the member 30.

Other water-swellable polymers that may comprise the topcoat 38 include polyethylene (PE) or polypropylene (PP) polymers, or copolymers of PE and PP, available from manufacturers such as Dow Chemical, Shell, and Basell. Still further preferable water-swellable topcoats 38 include ethylene vinyl acetate (EVA)copolymers (Henkel Adhesives, Elgin, Ill.), block copolymers of polybutylene terepthalate (DuPont, Wilmington, Del.), copolymers of long chain polyether glycols (Dow Chemical, Midland, Mich.), thermoplastic elastomers (GLS, Cary, Ill.), olefins (Shell, Houston, Tex.), urethanes (Franklin International, Columbus, Ohio), polypropylene, polyethylene (Dow Chemical, Midland, Mich.), polyurethane, low molecular weight mineral wax, polyacrylamides (Bayer, Leverkusen, Germany), and blends thereof.

Figure 4:
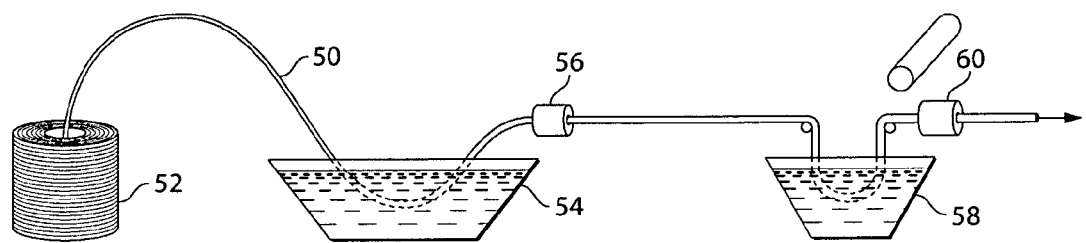
FIG. 4 illustrates an assembly line used for making the water-swellable, flexible reinforcement member according to FIGS. 1–3.

FIG. 4 illustrates the process for making the members 30 of FIGS. 1–3. The process begins by unrolling the fibers 50 from a reel 52. The fibers 50 represent filaments 32, bundles 34, or a combination of filaments 32 and bundles 54 as depicted in FIGS. 1–3. The fibers 50 are introduced to an application device 54, here a heated immersion bath 54 that holds the saturant 36. The bath 54 is maintained between approximately 90–140 degrees Celsius (200–280 degrees Fahrenheit) such that the primary saturant 36 has a viscosity of approximately 50–100 cps.

The coated fibers 50 exit the bath 54 and are introduced to a stripper die 56. In the embodiment shown in FIG. 4, the stripper die strips back the excess saturant 36 and to help impregnate the fibers 50. In one embodiment, the stripper die 56 has an internal diameter of approximately 0.84 millimeters (0.033 inches) to strip back the excess saturant 36 and to help impregnate the fibers 50.

The coated fibers are then introduced to an applicator 58 containing the water-swellable topcoat 38. Preferably, the applicator 58, as shown here, is a Nordson hot melt applicator. The water-swellable topcoat 38 enters the applicator 58 through an orifice (not shown). In the embodiment of the present invention, Dow Primacor 5990I, which has a melt point index of 1300 grams per 10 minutes, the material is heated to approximately 125 degrees Celsius (257 degrees Fahrenheit) as it enters the fixed orifice through a hose (not shown) and applied to the fibers 50. The fibers 50 exit the applicator 58 and enter a second stripper die 60, which, in one embodiment of the present invention, has an inner diameter of approximately 1.12 millimeters (0.044 inches). The second stripper die 60 removes excess water-swellable topcoat 38 and smoothes the outer surface of the water-swellable topcoat 38. The water-swellable topcoat is then cooled to form the reinforcement member 30.

Table 2 lists the results of water absorbency for a reinforcement made per the above process. The total amount of coating on the glass strand was approximately 25%. Of that, about 50% was the microcrystalline wax saturant, and 50% was a blend of water-swellable polymer (Henkel Q 4411) and non water-swellable polymer (Henkel 80-8254). The blend in turn was comprised of 59 wt % Q 4411 and 41 wt % 80-8254. Thus, if there is about 30% SAP in the Q 4411, the mount of SAP in the topcoat only is about 17.7 wt %. The amount of SAP in the total coating of the original fiber bundle taken as a whole is about 8.8 wt %.

The percent water absorbency after one minute submersion in water for this product is about 121% by weight of the entire original reinforcement. Furthermore, by placing the superabsorbent polymer hot melt at the surface of the strand, the material most effectively interacts with water. No superabsorbent powder is buried inside the matrix and "wasted" and thus not available for swelling.

TABLE 2

Water Absorbency of Reinforcement Member Coated with Wax and Top coated with a 59/41 Blend of Henkel Q 4411/80-8254
(After one minute submersion)

| Initial Wt (g) | Final Wt (g) | % Absorbance (by wt) |
| --- | --- | --- |
| 410 | 868 | 111.7 |
| 548 | 1191 | 117.3 |
| 402 | 906 | 125.4 |
| 497 | 1042 | 109.7 |
| 423 | 1027 | 142.8 |

Figure 5:
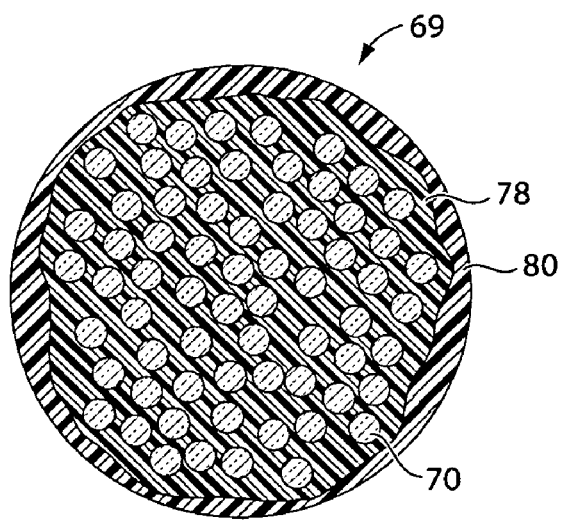
FIG. 5 is a cross-sectional view of a water-swellable, flexible reinforcement member according another embodiment of the present invention.
Figure 6:
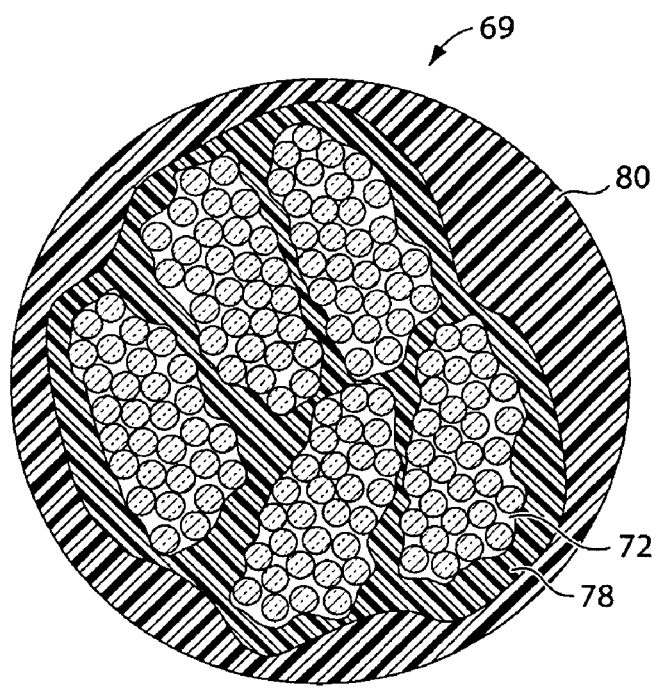
FIG. 6 is a cross-sectional view of a water-swellable, flexible reinforcement member according to another embodiment of the present invention.
Figure 7:
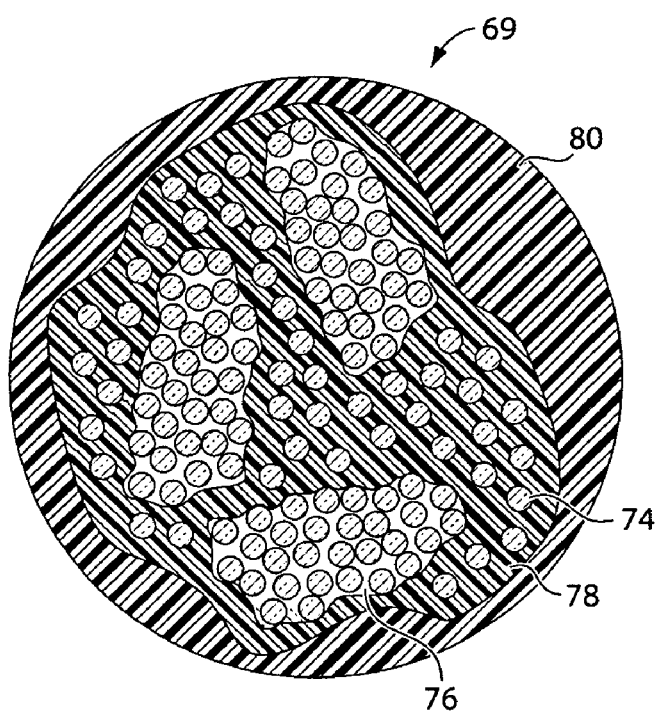
FIG. 7 is a cross-sectional view of a water-swellable, flexible reinforcement member according to another embodiment of the present invention.

A second embodiment as shown in FIGS. 5–7 shows reinforcement member 69. Fibers 70, bundles 72 or a combination of fibers and bundles 74, 76 are pre-coated with a superabsorbent coating 78 and then coated with a primary saturant 80. Any superabsorbent coating may be pre-coated on the strand as described above. One such coating is InstantDry™ superabsorbent coating (U.S. Pat. No. 6,380,298; Owens Corning; Toledo, Ohio).

Figure 8:
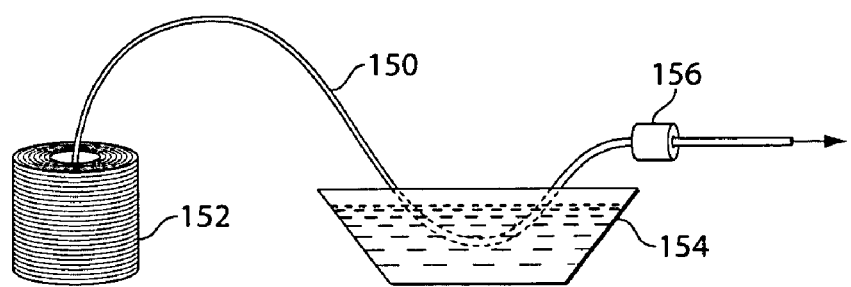
FIG. 8 is a illustrates an assembly line used for making the water-swellable, flexible reinforcement member according to FIGS. 5–7.

FIG. 8 illustrates the process for making the members 69 of FIGS. 5–7. The process begins by unrolling the fibers 150 from a reel 152. The fibers 150 represent strands 70, bundles 72, or a combination of strands 74 and bundles 76 as depicted in FIGS. 5–7. The fibers 150 are introduced to a first application device 154, here a heated immersion bath 154 that holds the saturant. The bath 154 is maintained at a temperature such that the primary saturant 136 has a viscosity of approximately 50–100 cps (between approximately 120–150 degrees Celsius (250–300 degrees Fahrenheit). The coated fibers 150 exit the bath 154 and are introduced to a stripper die 156. The coated fibers 150 are then cooled to form the reinforcement member 130 having a diameter of between approximately 0.5 and 0.1 mm.

Even though the superabsorbent coating is enclosed by a top layer of hydrophobic wax, there are enough fractures in the this coating from processing to allow water to easily penetrate to the superabsorbent polymer and cause water swelling. As mentioned above, other hot melt, water-swellable topcoats can be used such as ethylene vinyl acetate (EVA), duPont Hytrel® block copolymers of polybutylene terephthalate and long-chain polyether glycols (GLS Kraton), or other thermoplastic elastomers (TPE) or thermoplastic olefins (TPO) or thermoplastic urethanes (TPU), polypropylene, polyethlene, or polyurethane.

The water absorbency of the strand pre-coated coated with a superabsorbent polymer, is shown in Table 3. As shown, the reinforcement picked up 413% of water by weight of original reinforcement after only 1 minute of submersion.

TABLE 3

Water Absorbency of Reinforcement Member Pre-Coated with InstantDry ™ Superabsorbent Coating and Top coated with Wax
(After one minute submersion)

| Initial Wt | Final Wt | % Absorbance (by wt) |
| --- | --- | --- |
| 431 | 1939 | 349.7 |
| 407 | 1905 | 368.0 |
| 409 | 2438 | 496.1 |
| 415 | 2119 | 410.6 |
| 397 | 2138 | 438.5 |

In an alternative embodiment not shown, an extruder using a crosshead die or similar applicator apparatus may be used in place of the applicator 58 to introduce the topcoat 38 to the coated fibers 50.

Figure 9:
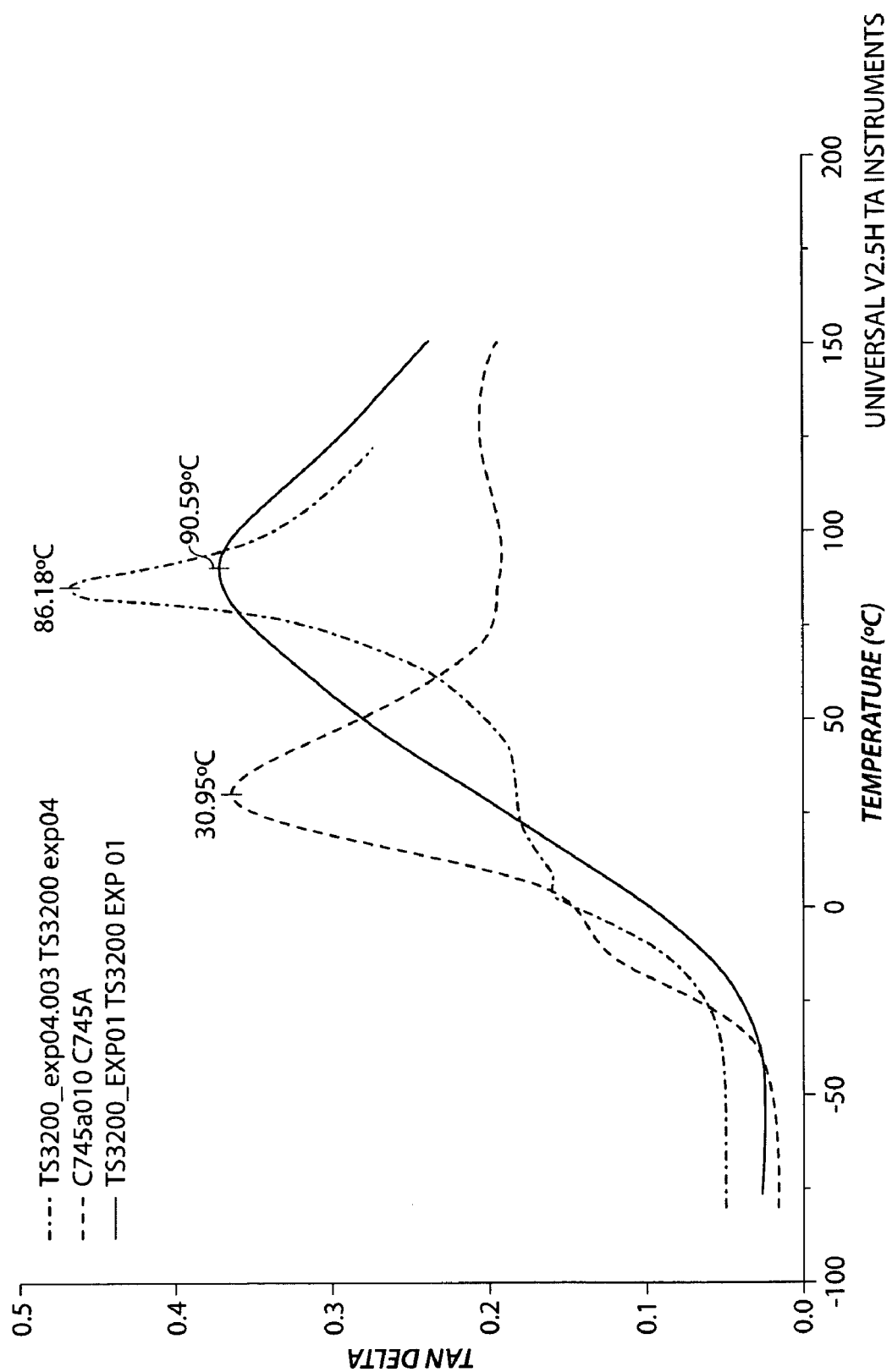
FIG. 9 illustrates a graph comparing glass transition temperatures of traditional coated reinforcements with flexible coated reinforcements of the present invention.

As can be seen in FIG. 9, the standard thermoset CR745A flexible reinforcement has a glass transition temperature, Tg, of 30.96°. Tg is the temperature where an amorphous polymer transitions from a brittle, vitreous material to a more pliable, more flexible, softer material. In contrast to the standard reinforcement, the two thermoplastic-coated reinforcements have Tg's that are about 86° and 91° C., respectively. The higher Tg allows for a processable and more flexible reinforcement at the cable's upper range of the usual operating range of −40° to +80° C. In contrast the polymer transitions to a stiff matrix at the lower temperature range. Being able to control Tg by selective choice of thermoplastic materials or blends of such materials and appropriate modifiers allows for the reinforcement to be customized to precisely meet the cable's performance requirements. As the reinforcement transitions from a flexible to a rigid member, the cable is protected from shrinkage from the polyethylene or other jacketing material as the cable experiences temperature cycles. Uncontrolled shrinkage can cause optical fiber signal attenuation or catastrophic optical fiber breakage.

Figure 10:
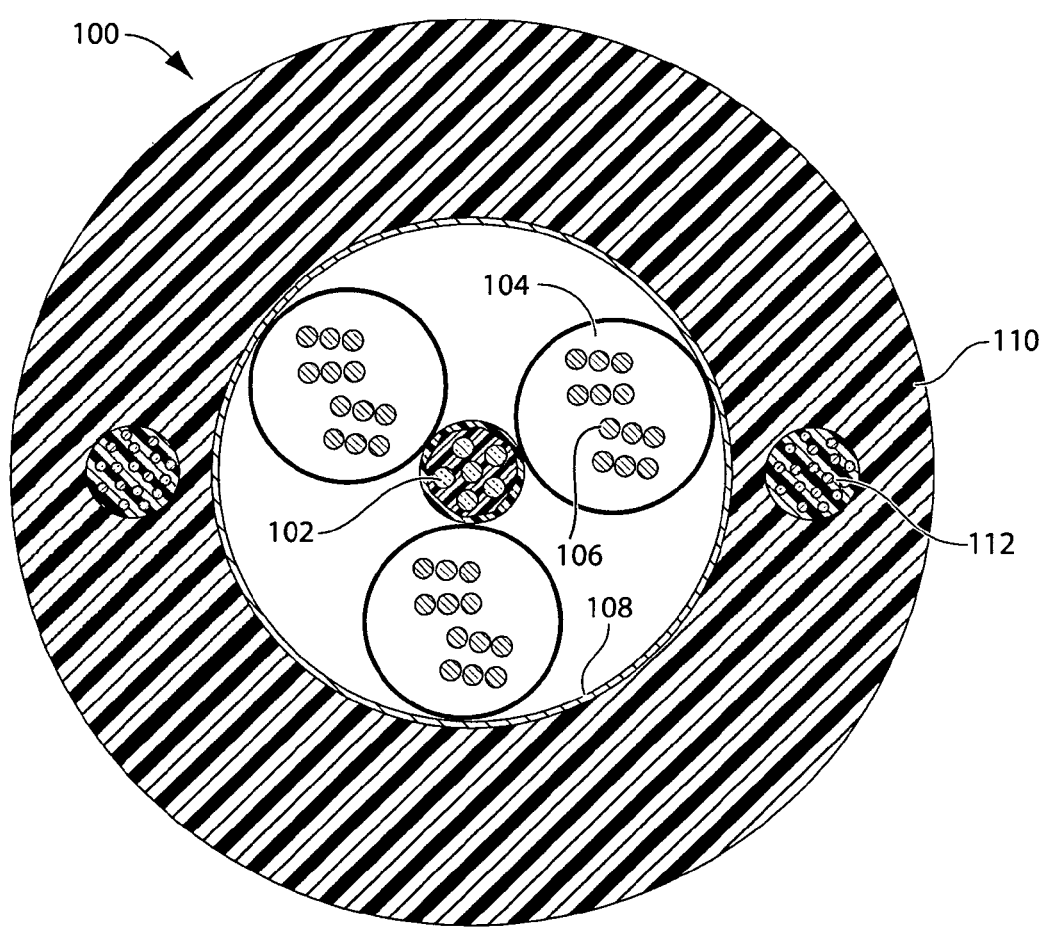
FIG. 10 is a cross-sectional view of a preferred embodiment of the water-swellable, flexible reinforcement member.

FIG. 10 illustrates cable structure 100 according to a preferred embodiment of the present invention. Cable structure 100 shows the water-swellable, flexible reinforcement member 102 positioned between three buffer tubes 104 containing optical fibers 106. The buffer tubes 104 are surrounded by water-blocking tape 108. The water-blocking tape 108 is surrounding by an outer HDPE sheath 110 having fiberglass reinforcing rods 112.

While the invention has been described in terms of preferred embodiments, it will be understood, of course, that the invention is not limited thereto since modifications may be made by those skilled in the art, particularly in light of the foregoing teachings.

What is claimed is:

1. A flexible reinforcement member for a communications cable comprising:
a plurality of high modulus fibers;
a primary saturant coupled to said plurality of high modulus fibers such that said primary saturant fills interstices between said high modulus fibers, serves as a matrix in which said plurality of high modulus fibers is dispersed and encased, and forms a strand of said primary saturant and said plurality of high modulus fibers, said primary saturant having a melting point below approximately 300 degrees Celsius and a melt viscosity of less than approximately 1000 centipoise; and
an outer layer of a high molecular weight, nonwater-based water-swellable polymer coupled to said primary saturant such that said outer layer surrounds said strand.

2. The flexible reinforcement member of claim 1, wherein said primary saturant has a melting point between about 100 to about 150 degrees Celsius and a melt viscosity of less than 500 centipoise.

3. The flexible reinforcement member of claim 1, wherein said plurality of high modulus fibers comprises a plurality of sized high modulus fibers selected from the group consisting of a plurality of sized or unsized aramid fibers and a plurality of sized or unsized poly(p-phenylene-2,6-benzobisoxazole) (PBO) fibers and a plurality of sized or unsized carbon fibers and a plurality of sized or unsized high silica glass fibers and sized or unsized high tenacity, linearized polyethylene fiber.

4. The flexible reinforcement member of claim 1, wherein said plurality of high modulus fibers comprises a plurality of glass fiber strands.

5. The flexible reinforcement member of claim 4, wherein said plurality of glass fiber strands comprises at least one glass fiber bundle, each of said at least one glass fiber bundle comprising a plurality of glass fiber filaments.

6. The flexible reinforcement member of claim 2, wherein said plurality of glass fiber strands comprises a plurality of glass fiber filaments and at least one glass fiber bundle, each of said at least one glass fiber bundle comprising a plurality of glass fiber filaments.

7. The flexible reinforcement member of claim 1, wherein said primary saturant comprises a low molecular weight mineral wax.

8. The flexible reinforcement member of claim 7, wherein said low molecular weight mineral wax is selected from the group consisting of a low molecular weight microcrystalline wax, a low molecular weight polyalphaolefin wax, a low molecular weight polyethylene wax, or a modified (oxidized or maleated) polyolefin such as polyethylene or polypropylene, and blends thereof.

9. The flexible reinforcement member of claim 1, wherein said primary saturant comprises a blend of a low molecular weight microcrystalline wax and a styrene butadiene rubber, wherein said blend is between approximately 0.1 and 99.9 percent by weight of said low molecular weight microcrystalline wax and between approximately 0.1 and 99.9 percent by weight of said styrene butadiene rubber.

10. The flexible reinforcement of claim 9, wherein said blend comprises a 50/50 by weight blend of said low molecular weight microcrystalline wax and said styrene butadiene rubber.

11. The flexible reinforcement member of claim 4, wherein said plurality of glass fiber strands comprises a plurality of sized glass fiber strands selected from the group consisting of a plurality of sized or unsized E-type glass fiber strands and a plurality of sized or unsized ECR-type glass fibers.

12. The flexible reinforcement member of claim 1, wherein said primary saturant comprises approximately 0.1 and 35 percent of the total weight of said flexible reinforcement member and wherein said outer layer of high molecular weight, nonwater-based, water-swellable polymer comprises between approximately 0.1 and 35 percent of the total weight of said flexible reinforcement member.

13. The flexible reinforcement member of claim 12, wherein said primary saturant comprises approximately 5 and 20 percent of the total weight of said flexible reinforcement member and wherein said outer layer of high molecular weight, nonwater-based, water-swellable polymer comprises between approximately 5 and 20 percent of the total weight of said flexible reinforcement member.

14. The flexible reinforcement member of claim 12, wherein said primary saturant comprises approximately 10 and 15 percent of the total weight of said flexible reinforcement member and wherein said outer layer of high molecular weight, nonwater-based, water-swellable polymer comprises between approximately 10 and 15 percent of the total weight of said flexible reinforcement member.

15. The flexible reinforcement member of claim 1, wherein said high molecular weight, nonwater-based, water-swellable polymer is selected from the group consisting of ethylene vinyl acetate (EVA) polymers, block copolymers of polybutylene terepthalate, copolymers of long chain polyether glycols, thermoplastic elastomers, olefins, urethanes, polypropylene, polyethylene, polyurethane, low molecular weight mineral wax, polyacrylamides and blends thereof.

16. The flexible reinforcement of claim 15, wherein the glass transition temperature (Tg) of said flexible reinforcement is greater than about 400° C.

17. The flexible reinforcement member of claim 12, wherein said outer layer of high molecular, nonwater-based, weight water-swellable polymer comprises an ethylene vinyl acetate polymer.

18. The flexible reinforcement member of claim 1, wherein said outer layer of high molecular weight, nonwater-based, water-swellable is a blend of water-swellable polymer and non water-swellable.

19. The flexible reinforcement member of claim 18, wherein the water absorbency for the reinforcement member is between about 111 to about 142 percent by weight.

* * * * *